(12) United States Patent
Yang et al.

(10) Patent No.: US 9,086,592 B2
(45) Date of Patent: Jul. 21, 2015

(54) DIRECT ILLUMINATION TYPE BACKLIGHT MODULE, BOTTOM REFLECTOR AND LIQUID CRYSTAL DISPLAY

(75) Inventors: Dongsheng Yang, Beijing (CN); Fei Liu, Beijing (CN); Zhicheng Na, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 172 days.

(21) Appl. No.: 13/424,498

(22) Filed: Mar. 20, 2012

(65) Prior Publication Data

US 2012/0242935 A1  Sep. 27, 2012

(30) Foreign Application Priority Data

Mar. 22, 2011 (CN) .................. 2011 2 0076792 U

(51) Int. Cl.
*G02F 1/13357* (2006.01)
*G02F 1/1335* (2006.01)

(52) U.S. Cl.
CPC .... *G02F 1/133603* (2013.01); *G02F 1/133605* (2013.01); *G02F 1/133606* (2013.01)

(58) Field of Classification Search
CPC ............. G02F 1/133606; G02F 2001/133607

USPC ........................................................... 349/64
See application file for complete search history.

(56) References Cited

U.S. PATENT DOCUMENTS

| | | | | |
|---|---|---|---|---|
| 2002/0030993 | A1* | 3/2002 | Itoh ............................. | 362/246 |
| 2003/0142247 | A1* | 7/2003 | Nishiyama et al. ............ | 349/67 |
| 2003/0234896 | A1* | 12/2003 | Kim ............................. | 349/65 |
| 2007/0279936 | A1* | 12/2007 | Song et al. .................... | 362/613 |
| 2008/0211989 | A1* | 9/2008 | Park .............................. | 349/64 |
| 2010/0321610 | A1* | 12/2010 | Tanaka et al. .................. | 349/62 |

* cited by examiner

*Primary Examiner* — Thanh-Nhan P Nguyen
(74) *Attorney, Agent, or Firm* — Ladas & Parry LLP

(57) ABSTRACT

Embodiments of the disclosed technology provide to a direct illumination type backlight module comprising: a bottom reflecting plate with a upper reflecting surface; a plurality of diffuse reflectors provided on the upper reflecting surface of the bottom reflecting plate, each of the diffuse reflectors having at least one diffusion reflecting surface; a light source array provided on the upper reflecting surface of the bottom reflecting plate and comprising a plurality of light emitting devices, a light emitting surface of each of the light emitting devices facing the diffusion reflecting surface of at least one of the diffuse reflectors so that light from the light emitting devices is scattered upwards by the diffuse reflectors; and a diffuser provided above the light source array. In addition, a bottom reflector and a liquid crystal display are also provided.

15 Claims, 3 Drawing Sheets

DIRECT ILLUMINATION TYPE BACKLIGHT MODULE, BOTTOM REFLECTOR AND LIQUID CRYSTAL DISPLAY

BACKGROUND

Embodiments of the disclosed technology relate to a direct illumination type backlight module, a bottom reflector and a liquid crystal display.

Currently, Liquid Crystal Displays (LCDs), among which transmission liquid crystal displays are mainstream products, have been dominating in the flat panel display (FPD) market. As the LCDs are non-self luminous display devices which need a backlight module, the display performance of the LCDs largely depends on the backlight module used for supplying light. Generally, the backlight module can be classified into two types, i.e. edge-lighting type backlight module and direct illumination type backlight module.

Generally, the edge-lighting type backlight, typically comprising a light source such as a cold cathode fluorescent lamp (CCFL) and a light emitting diode (LED), a light guide plate, a reflecting sheet, a diffusing sheet, and a prism sheet, is mainly used for small-sized or medium-sized LCDs such as a monitor of a computer. However, the edge-lighting type backlight module is not suitable for large-sized LCDs. If an edge-lighting type backlight module is used for a large-sized LCD, the weight and the cost of the light guide plate will be increased with the increasing size, and the uniformity and brightness of light emitted from the edge-lighting type backlight will be deteriorated. On the other hand, the direct illumination type backlight, due to absence of the light guide plate, is mainly used for large-sized LCDs such as a liquid crystal television.

SUMMARY

An embodiment of the disclosed technology provides a direct illumination type backlight module, comprising: a bottom reflecting plate with a upper reflecting surface; a plurality of diffuse reflectors provided on the upper reflecting surface of the bottom reflecting plate, each of the diffuse reflectors having at least one diffusion reflecting surface; a light source array provided on the upper reflecting surface of the bottom reflecting plate and comprising a plurality of light emitting devices, a light emitting surface of each of the light emitting devices facing the at least one diffusion reflecting surface of at least one of the diffuse reflectors so that light from the light emitting devices is scattered upwards by the diffuse reflectors; and a diffuser provided above the light source array.

Another embodiment of the disclosed technology provides a bottom reflector, comprising: a bottom reflecting plate with an upper reflecting surface; and a plurality of diffuse reflectors provided on the upper reflecting surface of the bottom reflecting plate, and each of the diffuse reflectors having at least one diffusion reflecting surface.

Still another embodiment of the disclosed technology provides a liquid crystal display comprising the direct illumination type backlight according to any embodiments of the disclosed technology.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
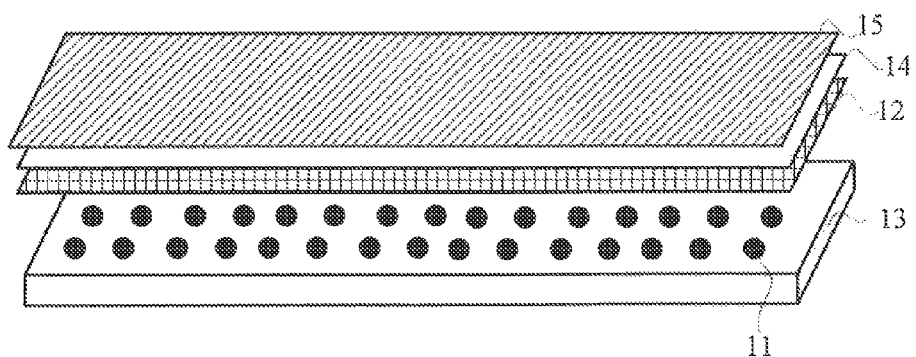
FIG. 1 is a structural schematic view showing a conventional direct illumination type backlight module.

As shown in FIG. 1, a typical direct illumination type backlight module comprises a light source 11 such as CCFL or LED, a diffusing plate 12, a bottom reflecting sheet 13, a diffusing sheet 14 and a brightness enhancement film 15. The light source is arranged within a cavity formed by the diffusing sheet 12 and the bottom reflecting sheet 13. A portion of the light incident on the diffusing sheet 12 is reflected back onto the bottom reflecting sheet 13 and further reflected by the bottom reflecting sheet 13 so as to achieve primary light mixing in the cavity at a height sufficient for light mixing. Then, the light is uniformly diffused by the diffusing sheet 14 and enters the horizontal brightness enhancement film 15 with microstructures of prism sheet so that the over-scattered light beam is converged within a certain viewing angle. In this way, the light emitted from the original light source finally exit as a surface light source; however, the height for sufficient light mixing in the above structure may be relatively large.

There are two traditional methods for optimizing the light mixing in a direct illumination type backlight module, i.e. adjusting the pitch between point light sources (light emitting devices) such as LEDs in the light source, and enlarging the height of the lamp cavity. However, both the methods have their own disadvantages. With regard to the former method, the manufacturing cost will be increased due to a larger arrangement density of the LED point light sources. With regard to the later method, although a lamp cavity with larger height can ensure a sufficient light mixing height, the thickness of the direct illumination type backlight module and thus the thickness of the LCD can be increased.

An embodiment of the disclosed technology provides a bottom reflector and a direct illumination type backlight module comprising the bottom reflector which enables excellent light mixing without adding extra cost or increasing the thickness of the lamp cavity of the direct illumination type backlight module and the thickness of the LCD. One of the main differences between the conventional backlight module and the backlight module according to the embodiment of the disclosed technology lies in that diffuse reflectors are further provided on the bottom reflecting sheet, and light emitting devices having side light emitting surfaces are adopted in the light source of the backlight module according to the embodiment of the disclosed technology. For example, the side light emitting surfaces are substantially perpendicular to the upper surface of the bottom reflecting sheet on which the light emitting devices is provided. Therefore, instead of incident on and reflected back by the diffusing plate and then reflected by the bottom reflecting sheet, at least a portion of the light emitted from the light emitting device directly impinges onto the diffuse reflector so as to be scattered upwards and mixed. According to the embodiment of the disclosed technology, the light emitting angle of the emitted light being scattered by the diffuse reflector is enlarged, so that the light mixing height is effectively reduced, and the thicknesses of the backlight and thus the thickness of the LCD will not be increased.

Hereinafter, embodiments of the disclosed technology will be described in detail with reference to accompanying drawings.

Figure 2A:
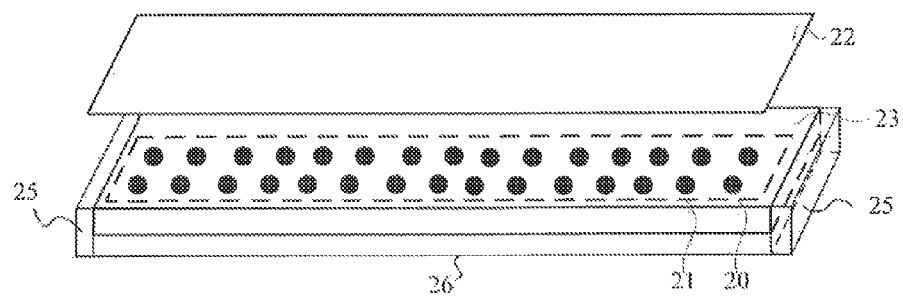
FIG. 2a is a structural schematic view showing a direct illumination type backlight module according to an embodiment of the disclosed technology.

As shown in FIG. 2a, an embodiment of the disclosed technology provides a direct illumination type backlight comprising a light source array 21 composed of a plurality of light emitting devices 20, a diffuser 22, a bottom reflecting plate 23, and a plurality of diffusion reflectors 24 being provided on an upper surface of the bottom reflecting plate 23. The upper surface of the bottom reflecting plate 23 is a reflecting surface.

The light source array 21 is provided above the bottom reflecting plate 23 and under the diffuser 22. Each of the light emitting devices 20 has a light emitting surface x on the side face thereof. In order to illustrate the whole structure of the backlight module more clearly, the diffuse reflectors and the light emitting surface x are not shown in FIG. 2a. The diffuse reflectors and the light emitting surface x are shown in further detail in FIG. 2b.

It is understood that the diffuser 22 mentioned above can be selected from the group consisting of a diffuser sheet, a diffuser plate and the combination thereof.

Preferably, a brightness enhancement film can be further provided over the diffuser 22.

Figure 2B:
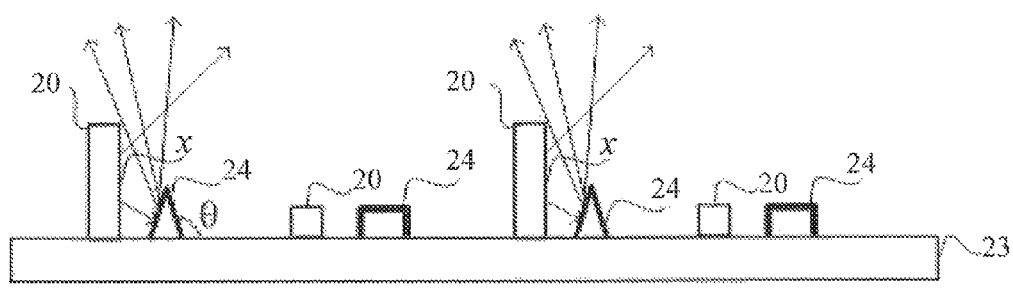
FIG. 2b is a cross-sectional view showing a bottom reflector according to an embodiment of the disclosed technology.

FIG. 2b is a schematic side view illustrating the bottom reflecting plate 23 according to the embodiment of the disclosed technology. In FIG. 2b, lines with arrows represent the light emitted from the light emitting devices 20, and the diffuse reflectors is referred by "24". Herein, each of the diffuse reflectors 24 may have a prism shape or any other shapes and have at least one diffusion reflecting surface. In one example, the diffusion reflecting surface of each diffuse reflector 24 is a side surface of the prism-shaped reflector. As shown in FIG. 2b, the angle θ between the upper surface of the bottom reflecting plate 23 and the diffusion reflecting surface of the diffuse reflector 24 is an obtuse angle. At least one diffuse reflector 24 is provided close to each of the light emitting devices 20, and the light emitting surface of the light emitting device 20 faces the diffusion reflecting surface of the diffuser reflector 24 so that light from the light emitting device 20 can be scattered upwards by the diffuser reflector. In one example, in order to achieve better light mixing, the light emitting surfaces x of the adjacent light emitting devices 20 in FIG. 2b are perpendicular to each other. In the case that the light emitting surfaces of the adjacent light emitting devices 20 are perpendicular to each other, the corresponding diffuse reflectors 24 can also be arranged such that their diffuse reflecting structures 24 are perpendicular to each other.

The light emitting devices 20 described above can be CCFLs or LEDs but not limited thereto. The diffuser 22 can be a diffusing sheet or a diffusing plate. The diffusing sheet is preferably adopted as the diffuser 22 due to its small thickness.

Figure 3A:
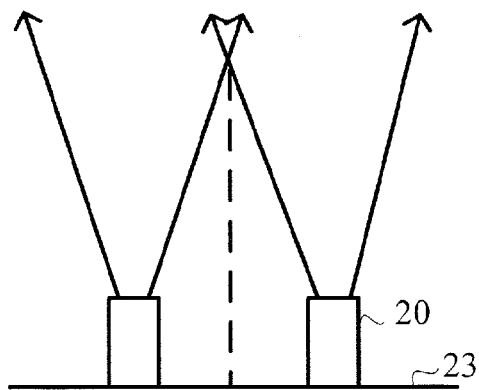
FIG. 3a is a schematic view showing the light mixing in the prior art.
Figure 3B:
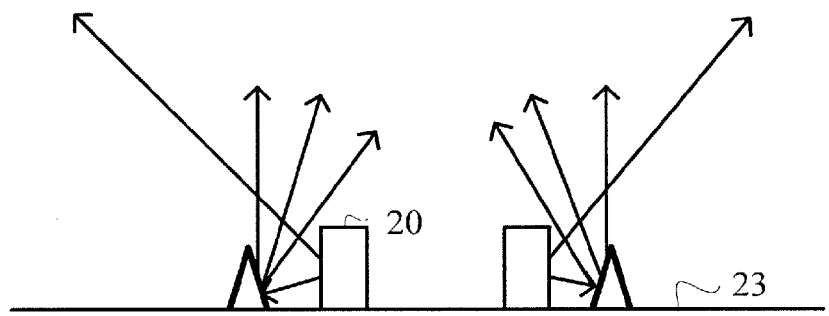
FIG. 3b is a schematic view showing the light mixing according to an embodiment of the disclosed technology.

FIG. 3a and FIG. 3b show light mixing effect in a conventional backlight module and in the backlight module according to the embodiment of the disclosed technology, respectively. In these two figures, the solid line with arrow represents the light and its traveling direction, and the height of the dashed line in FIG. 3a represents the light mixing height. It can be seen from the figures that, by scattering the light emitted from the light emitting devices 20 through the diffuse reflectors in the backlight module according to the embodiment of the disclosed technology, the light emitting angle of the emitted light being scattered by the diffuse reflector 24 is enlarged and the light mixing height is effectively reduced, thus the thickness of the backlight module can be reduced.

Figure 4:
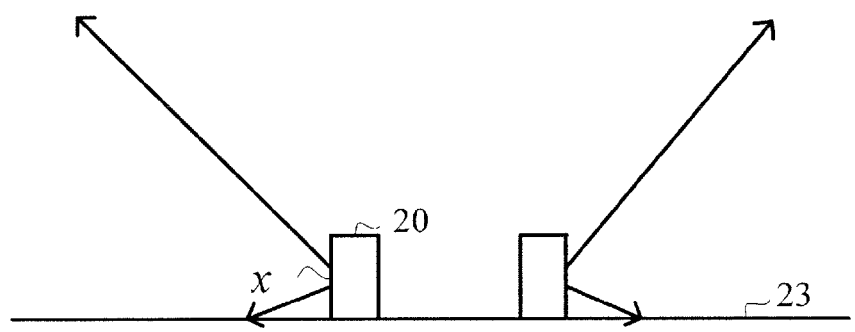
FIG. 4 is a schematic cross-sectional view showing a light emitting device group comprising two light emitting devices with their light emitting surfaces facing away from each other according to an embodiment of the disclosed technology.

In an embodiment of the disclosed technology, the light source array can be divided into a plurality of light emitting device groups, and each of the light emitting device groups comprises two light emitting devices 20 with their light emitting surfaces facing away from each other, as shown in FIG. 4. For clarity of the drawing illustration, the diffuse reflectors provided on the bottom reflecting plate 23 are omitted from FIG. 4.

In an embodiment of the disclosed technology, the light emitting surfaces x of the light emitting devices 20 in any light emitting device group may be perpendicular to those in at least one of the adjacent groups. In this way, the light emitting device groups are arranged perpendicular to each other so as to achieve more uniform light mixing.

Figure 5:
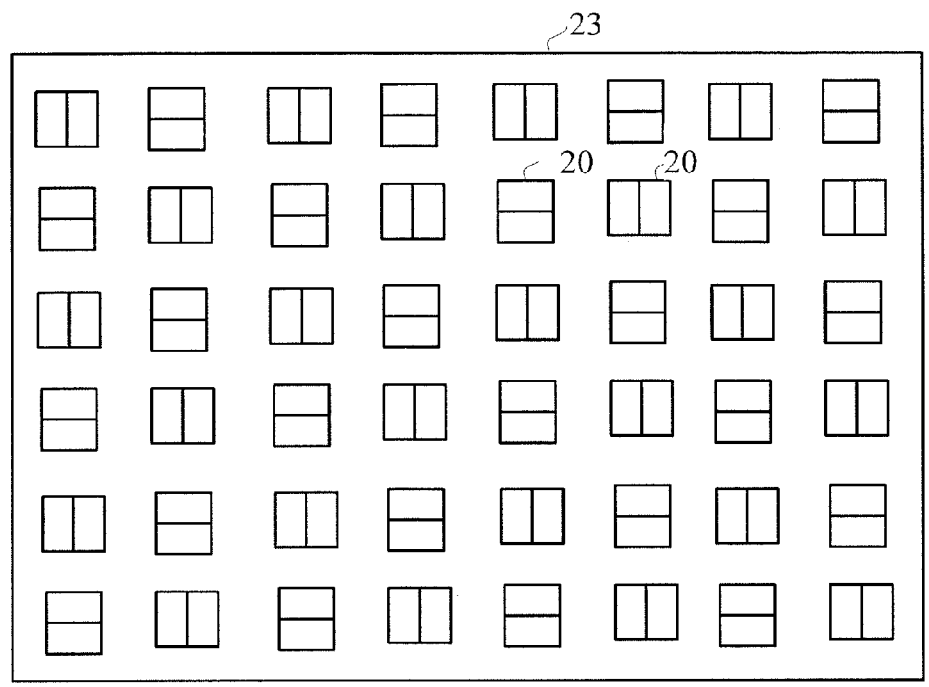
FIG. 5 is a schematic top view showing an arrangement of the light emitting device groups according to an embodiment of the disclosed technology, wherein the light emitting surfaces of the light emitting devices in any group are perpendicular to those in all of the adjacent groups.

In an embodiment of the disclosed technology, the light emitting surfaces x of the light emitting devices 20 in any light emitting device group may be perpendicular to those in all of the adjacent groups. For example, as shown in FIG. 5 which is a top view showing a light source array in accordance with the embodiment of the disclosed technology, each of the light emitting device groups is formed by bonding two light emitting devices 20 which are represented by the smallest rectangles in the drawing. In each group, the bonded surfaces of the light emitting devices are the surfaces opposite to the light emitting surfaces. It can be seen that the bonded surface of any light emitting device group is perpendicular to that of all of the four adjacent groups (up, down, left and right). In this way, a more uniform light mixing effect can be obtained. For clarity of the drawing illustration, diffuse reflectors located on the bottom reflecting plate 23 are omitted in FIG. 5.

Figure 6:
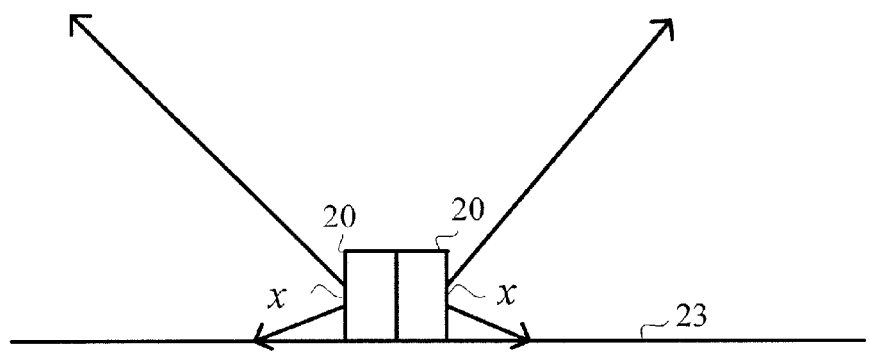
FIG. 6 is a schematic view showing a light emitting device group in which two light emitting devices are bonded together according to an embodiment of the disclosed technology.

In an embodiment of the disclosed technology, with regard to the two light emitting devices 20 in each of the light emitting device groups described above, as shown in FIG. 6, the surface opposite to the light emitting surface x of the left light emitting device 20 is attached to the surface opposite to the light emitting surface x of the right light emitting device 20. For clarity of the drawing illustration, diffuse reflectors provided on the bottom reflecting plate 23 are omitted in FIG. 6.

In an embodiment of the disclosed technology, the light source array comprises a plurality of light emitting device groups each of which comprises two light emitting devices with their light emitting surfaces facing each other and with a space therebetween, and at least one diffuse reflector is provided between the two light emitting devices to scatter the light from the two light emitting devices.

In an embodiment of the disclosed technology, the direct illumination type backlight module may further comprise a back board 26 and a side frame 25, wherein the back board 26 is provided under the bottom reflecting plate 23, and the diffuser 22 and the bottom reflecting plate 23 are fixed onto the side frame 25.

The main advantage of the embodiments of the disclosed technology is that the light mixing height can be effectively reduced only by changing the position of the light emitting surface of the light emitting devices and the structure of the bottom reflector.

In addition, as compared with the conventional direct illumination type backlight modules, the direct illumination type backlight module according to the embodiments of the disclosed technology has the following advantages.

Firstly, compared with the relatively convergent light emitted from the light source in the conventional backlight, the light emitted from the light emitting device groups is more divergent, thus covering much larger surface of the diffuser; Secondly, although light loss may inevitably occurs compared with that in the conventional direct luminescence type backlight module, it can be minimized due to the reflection of the bottom reflector; Thirdly, by the arrangement in which the light emitting surfaces of the adjacent light emitting device groups are perpendicular to each other, more uniform light mixing can be obtained and the light mixing height can be further reduced.

In addition, an embodiment of the disclosed technology provides a bottom reflector comprising the bottom reflecting plate and the diffuse reflector provided thereon. The characteristics and the corresponding technical effects of the bottom reflecting plate and the diffuse reflector are the same as those described above, and the overlapped description will not be repeated.

In addition, an embodiment of the disclosed technology provides a liquid crystal display comprising the direct illumination type backlight according to any embodiment of the disclosed technology.

The disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. A direct illumination type backlight module, comprising:
    a bottom reflecting plate with an upper reflecting surface;
    a plurality of diffuse reflectors provided on the upper reflecting surface of the bottom reflecting plate, each of the diffuse reflectors having at least one diffusion reflecting surface;
    a light source array provided directly on the upper reflecting surface of the bottom reflecting plate and comprising a plurality of light emitting devices, each of the light emitting devices having a planar light emitting surface, and the planar light emitting surface being located at one side of the light emitting devices and facing the at least one diffusion reflecting surface of at least one of the diffuse reflectors so that light from the light emitting devices is scattered upwards by the diffuse reflectors; and
    a diffuser provided above the light source array.

2. The direct illumination type backlight module of claim 1, wherein an angle between the at least one diffusion reflecting surface of each of the diffuse reflectors and the upper reflecting surface of the bottom reflecting plate is an obtuse angle.

3. The direct illumination type backlight module of claim 1, wherein each of the diffuse reflectors has a prism shape, and the at least one diffusion reflecting surface is a side surface of the prism-shaped reflector.

4. The direct illumination type backlight according to claim 1, wherein the light emitting surface of each light emitting device is perpendicular to the upper reflecting surface of the bottom reflecting plate.

5. The direct illumination type backlight according to claim 1, wherein the light emitting surfaces of the adjacent light emitting devices are perpendicular to each other.

6. The direct illumination type backlight according to claim 1, wherein the light source array comprises a plurality of light emitting device groups each of which comprises two light emitting devices with their light emitting surfaces facing away from each other.

7. The direct illumination type backlight according to claim 6, wherein the light emitting surfaces of the light emitting devices in any light emitting device group are perpendicular to those in at least one adjacent group.

8. The direct illumination type backlight according to claim 7, wherein the light emitting device in each group are bonded together by coupling their surfaces opposite to the light emitting surfaces.

9. The direct illumination type backlight according to claim 6, wherein the light emitting surfaces of the light emitting devices in any light emitting device group are perpendicular to those in all of the adjacent groups.

10. The direct illumination type backlight according to claim 9, wherein the light emitting device in each group are bonded together by coupling their surfaces opposite to the light emitting surfaces.

11. The direct illumination type backlight according to claim 6, wherein the light emitting device in each group are bonded together by coupling their surfaces opposite to the light emitting surfaces.

12. The direct illumination type backlight according to claim 1, further comprising a back board and a side frame, wherein the back board is provided under the bottom reflecting plate, and the diffuser, the bottom reflecting plate and the back board are fixed onto the side frame.

13. The direct illumination type backlight according to claim 1, wherein the diffuser is a diffusing sheet.

14. The direct illumination type backlight according to claim 1, the light source array comprises a plurality of light emitting device groups each of which comprises two light emitting devices with their light emitting surfaces facing each other and with a space therebetween, and at least one diffuse reflector is provided between the two light emitting devices to scatter the light from the two light emitting devices.

15. A liquid crystal display comprising a direct illumination type backlight module,
    wherein the direct illumination type backlight module comprises:
    a bottom reflecting plate with a upper reflecting surface;

a plurality of diffuse reflectors provided on the upper reflecting surface of the bottom reflecting plate, each of the diffuse reflectors having at least one diffusion reflecting surface;

a light source array provided directly on the upper reflecting surface of the bottom reflecting plate and comprising a plurality of light emitting devices, each of the light emitting devices having a planar light emitting surface, and the planar light emitting surface being located at one side of the light emitting devices and facing the at least one diffusion reflecting surface of at least one of the diffuse reflectors so that light from the light emitting devices is scattered upwards by the diffuse reflectors; and a diffuser provided above the light source array.

* * * * *